United States Patent
McGowen et al.

(10) Patent No.: US 6,427,195 B1
(45) Date of Patent: Jul. 30, 2002

(54) THREAD LOCAL CACHE MEMORY ALLOCATOR IN A MULTITASKING OPERATING SYSTEM

(75) Inventors: Alan McGowen, San Jose; Ashish Karkare, Santa Clara, both of CA (US)

(73) Assignee: Hewlett-Packard Company, Palo Alto, CA (US)

(*) Notice: Subject to any disclaimer, the term of this patent is extended or adjusted under 35 U.S.C. 154(b) by 132 days.

(21) Appl. No.: 09/592,781

(22) Filed: Jun. 13, 2000

(51) Int. Cl.[7] .............................. G06F 12/06
(52) U.S. Cl. ........................ 711/153; 711/173
(58) Field of Search ...................... 711/147, 170, 711/173, 153

(56) References Cited

U.S. PATENT DOCUMENTS 6,058,460 A * 5/2000 Nakhimovsky ............. 711/153
6,209,066 B1 * 3/2001 Hölzle et al. ............... 711/153

* cited by examiner

Primary Examiner—Kevin L. Ellis (57) ABSTRACT

A memory allocator provides a cache blocks private to each thread of a multi-threaded application, and thereby minimizes performance losses associated with mutual exclusion (MUTEX) contention, MUTEX locking and/or coalescence operations. The memory allocator maintains thread local cache slots in a linked list of arrays. Upon a memory allocation request from a thread, blocks of the memory, which ordinarily require MUTEX locking, are cached in the local thread cache slot allocated to the requesting thread, and the request is satisfied from the cache slot allocated to the requesting thread. Each cache slot is private to the thread to which it is assigned, and thus does not require MUTEX locking. Further, the cache slots do not require defragmentation thereof, and thus require no coalescence operations. Thus, the performance of the multi-threaded application program is optimized.

18 Claims, 6 Drawing Sheets

THREAD LOCAL CACHE MEMORY ALLOCATOR IN A MULTITASKING OPERATING SYSTEM

TECHNICAL FIELD

The present invention generally relates to computer operating systems. More particularly the present invention relates to performance optimization of multi-threaded application programs by reducing the need for mutual exclusion locking and/or the need for defragmentation operations, i.e., coalescence operations.

BACKGROUND ART

A single-tasking operating systems are inefficient because computer programs or program subroutines are executed serially, i.e., no computer program or program subroutine can begin to execute until the previous one terminates. Inefficiencies inherent in such single-tasking operating system led to the development of multitasking or multithreaded operating systems. In these latter operating systems, each computer program, or process, being executed may comprise one or more sub-processes (sometimes referred to as threads). A multi-tasking operating system allows more than one thread to run concurrently. Modem operating systems include user space memory allocators, e.g., malloc family of function calls, to manage allocation/deallocation of memory.

While it is significantly more efficient than a single-tasking operating systems, a multi-tasking operating system requires a significant number of new features in order to allow an orderly processing of multiple threads at the same time. One of the special requirements is safeguarding against corruption of memory as a result of a contentious accessing of a memory location by more than one thread.

In particular, one known conventional solution for the above safeguarding is by the use of a mutual exclusion (MUTEX) lock. Typically a region of the memory is identified as a critical region that contains critical data structures which could become corrupted if they were manipulated concurrently by multiple threads. A MUTEX lock is given to an owner thread currently operating in the critical region, and prevents other threads from executing in the critical region while the owner thread is executing. When the owner thread is no longer operating in the critical region, the MUTEX lock is released to allow another thread to take ownership of the critical region. The use of a MUTEX lock thus maintains integrity of the data structures in the critical region.

However, MUTEX locking exacts a significant performance cost. Firstly, all other threads are prevented from executing in the critical region while the MUTEX is locked. This means that any other thread that attempts to execute in the critical region must wait until the lock is released (e.g., in case of a binary MUTEX) before entering the region. The idling delay of the threads while waiting for the release of the MUTEX lock is sometimes referred to as the performance cost of "MUTEX contention".

Secondly, the time necessary to acquire and release the MUTEX lock in-and-of themselves may be significant performance cost. For example, even when only a single thread is running at the time, in order to access the critical region, the MUTEX lock must nevertheless be acquired and released, thus adding delay. This delay associated with acquisition and release of MUTEX lock is sometimes referred to as the performance cost of "MUTEX locking".

In application program interfaces (API) using memory allocators, e.g., a malloc, the performance cost of both the MUTEX contention and MUTEX locking can be very large for applications that use the APIs intensively. In a simplistic locking scheme, e.g. locking a MUTEX around all the code of the API, effectively only one thread can use the API at a time. This can lead to unacceptably poor performance of a multi-threaded program. As can be appreciated, minimizing MUTEX contentions and MUTEX locking is crucial in optimizing performance of multi-threaded applications.

Prior known attempts to reduce MUTEX contentions in a memory allocator, e.g., a malloc family of function calls, include multiple heaps (or arenas) and multiple free lists. In the multi-arena solution, multiple memory allocation arenas, each having its own MUTEX lock, are maintained. In addition, each thread is assigned to one of the multiple memory allocation arena. Because fewer threads are assigned to a single arena, fewer threads are likely to contend for the same MUTEX lock. The number of arenas may be tunable to allow the application program to control how many threads are contending for each MUTEX lock.

While the multi-arena solution does reduces MUTEX contentions, it does not completely eliminate them since there are still some contentions occurring within each arena. Possibly, MUTEX contentions may be eliminated if each thread is given its own arena. However, since each arena grows separately, increasing the number of arenas can significantly increase memory consumption of a multi-threaded application. Thus, per-thread-arena is not a practical solution in a typical multi-thread applications. Moreover, in the per-thread-arena solution may not eliminate the performance cost of MUTEX locking.

Another problem associated with conventional memory allocators, e.g., a malloc, is the performance cost associated with coalescence of freed memory blocks. Over a period of time of accessing a memory, the available memory space can be fragmented, i.e., exists in small blocks. When new data is stored in the scattered fragmented small blocks of memory, it takes longer time to access the newly stored data than if the data was stored in a single contiguous block of memory.

Conventionally, the memory fragmentation problem is addressed by coalescing freed blocks with free neighboring blocks (if there are any). The resulting coalesced block has a larger size than when it first became free, and thus it requires a rearrangement of the data structure (e.g., the free list employed to keep track of bocks of a given size) to reflect the existence of the new block with the new size and the removal of the smaller blocks that were coalesced into the new block.

This rearranging is very time consuming since it involves searching the free list for the insertion point of the new block, and for the blocks to be removed. Coalescence is thus a fairly expensive operation performance wise. A number of conventional algorithms have been devised to attempt to reduce performance costs associated with coalescence operations. For example, conventional small block allocators (SBA) do not coalesce freed blocks in satisfying requests for small blocks of memory. Additionally, prior attempts, e.g., Cartesian trees, have been made to reduce the search times of the free list.

Unfortunately, however, even with these prior attempts, conventional memory allocators have not been able to eliminate the need for coalescence operations, and thus still suffer from a significant performance loss due to coalescence operations.

Thus, what is needed is an efficient system for and method of memory allocation, which further reduces the MUTEX contentions and/or the MUTEX locking, and thus the performance losses attendant thereto.

What is also needed is an efficient system and method for memory allocation, which further reduces the need for coalescence operations, and the performance losses attendant thereto.

SUMMARY OF INVENTION

In accordance with the principles of the present invention, a method of allocating a block of memory in response to a memory allocation request from a thread in a multi-threaded operating system, comprises providing a cache slot being private to the thread, the cache slot having cached therein the block of memory previously freed by the thread, determining whether the memory allocation request can be satisfied out of the cache slot, and if the memory allocation request can be satisfied out of the cache slot, satisfying the memory allocation request out of the cache slot.

In addition, in accordance with the principles of the present invention, a computer readable storage medium having stored thereon a computer program for implementing a method of allocating a block of memory in response to a memory allocation request from a thread in a multi-threaded operating system, the computer program comprising a set of instructions for providing a cache slot being private to the thread, the cache slot having cached therein the block of memory previously freed by the thread, determining whether the memory allocation request can be satisfied out of the cache slot, and if the memory allocation request can be satisfied out of the cache slot, satisfying the memory allocation request out of the cache slot.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplar embodiment, particularly, with references to an example in which a specific implementation of the invention is described using C programming language. However, one of ordinary skill in the art would readily recognize that the same principles are equally applicable to, and can be implemented in, other implementations and designs using any other programming language, and that any such variation would be within such modifications that do not depart from the true spirit and scope of the present invention.

In accordance with the principles of the present invention, a memory allocator provides a cache blocks private to each thread of a multi-threaded application, and thereby minimizes performance losses associated with mutual exclusion (MUTEX) contention, MUTEX locking and/or coalescence operations. The memory allocator maintains thread local cache slots in a linked list of arrays. Upon a memory allocation request from a thread, blocks of the memory, which ordinarily require MUTEX locking, are cached in the local thread cache slot allocated to the requesting thread, and the request is satisfied from the cache slot allocated to the requesting thread. Each cache slot is private to the thread to which it is assigned, and thus does not require MUTEX locking. Further, the cache slots do not require defragmentation thereof, and thus require no coalescence operations. Thus, the performance of the multi-threaded application program is optimized.

Figure 1:
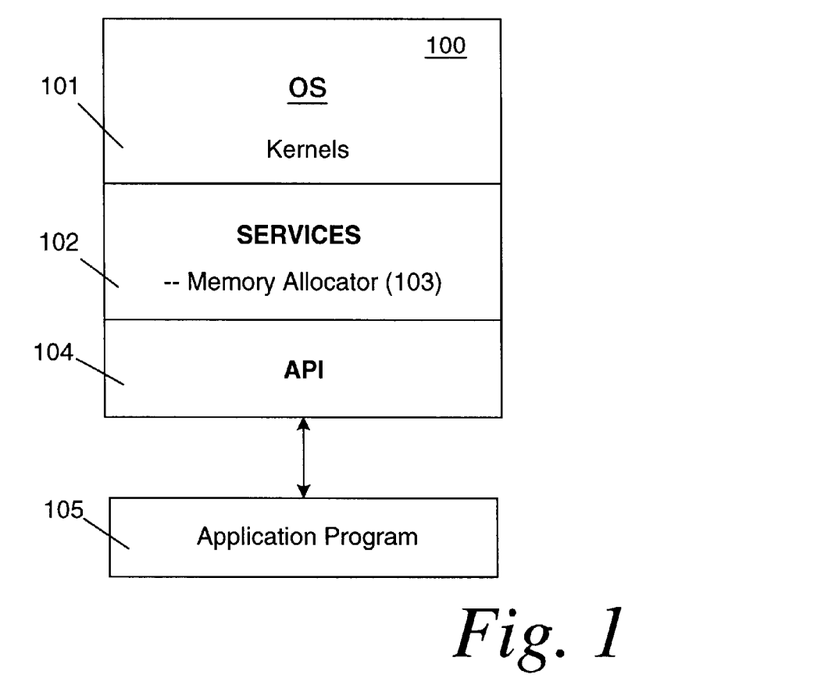
FIG. 1 is a block diagram showing the relevant portions of an operating system.

In particular, FIG. 1 shows a multi-tasking operating system 100, which includes a kernels layer 101, services layer 102 and an application program interface (API) layer 104. The API layer 104 allows an application program 105, which may include one or more processes or threads during the run time, to access the services 102 of the operating system 100, which may include a memory allocator 103.

Figure 2:
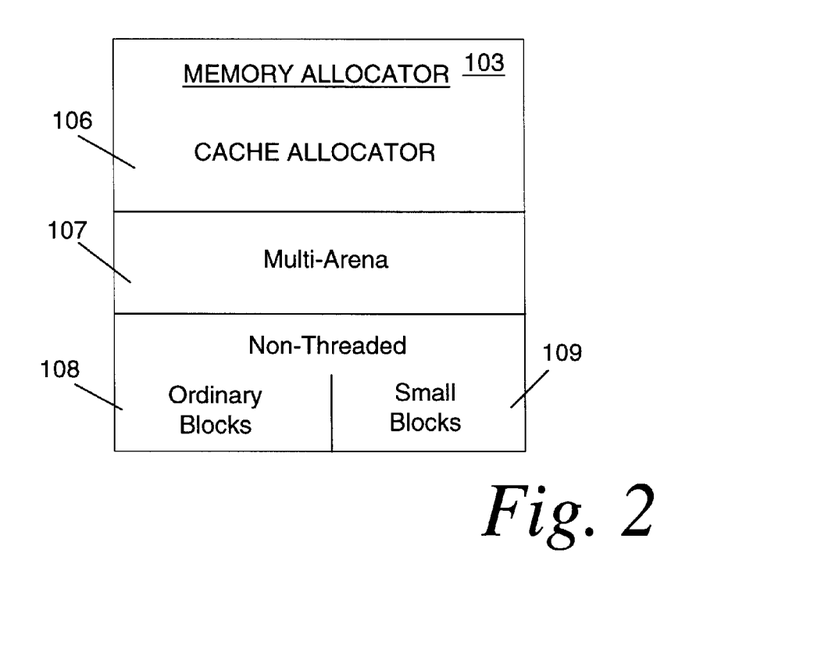
FIG. 2 is a block diagram of an exemplary embodiment of the memory allocator in accordance with the principles of the present invention.

The memory allocator 103 in accordance with the principles of the present invention may in turn have several layers. As shown in FIG. 2, in an embodiment of the present invention, the memory allocator 103 may include, inter alia, e.g., a cache allocator layer 106, multi-arena allocator layer 107, and a non-threaded allocator layer that includes a ordinary blocks allocator portion 108 and a small blocks allocator portion 109. In an embodiment of the present invention, the cache allocator 106 maintains a linked list of arrays of thread local cache slots, each of which may be assigned to one of the threads of the application program 105.

In an embodiment of the present invention, the basic structure for a thread local cache is defined as a "cache slot" as shown below.

```
/* Cache slot structure*/
typedef struct_cache_slot
    struct local_holding_head * m_sba;
    struct local_free_blockptr * m_free;
    struct local_free_blockptr * m_head[MAX_
        BUCKETS];
    struct local_free_blockptr * m_tail[MAX_
        BUCKETS];
    char_initialized; /* If set, this slot is initialized. */
    char_free; /* If clear, a thread is using this slot. */
    int arena_id;
    time_t_last_used; /* Exit time of last thread to use
        this cache. */
    struct_cache_slot * next_extent; /* Pointer to next
        cache extent. */
}_cache_slot_t;
```

The local holding header, m_sba, is a structure defining an array of local holding headers for caching small blocks, e.g., with the small block allocator (SBA). The local free block pointer, m_free, is a structure defining a linked list of free cache pointers for caching ordinary blocks. The local free block pointer, m_head [ ], is a structure defining an array of pointers to the heads of the linked lists of cached ordinary blocks. The index of this array is the "bucket", which determines the size blocks. Blocks are stored in descending order of sizes in each bucket. The local free block pointer, m__tail [ ], is a structure defining an array of pointers to the tails of the linked lists of cached ordinary blocks.

The __initialized flag specifies that the particular cache slot has been initialized if the value thereof is, e.g., a binary 1. The __free flag specifies whether the particular cache slot is free. The arena__id is an integer which specifies the arena of the thread holding the particular cache slot. The __last__ used is the exit time of the thread which last used the particular cache slot, and is used for cache retirement and/or replacement. The __next__extent is a pointer to the next extent of cache blocks, and is used for dynamically expanding the number of cache slots.

For caching an ordinary block, a basic structure referred to herein as the "cache pointer" is utilized, and is defined as:

```
/* Cache pointer */
struct local__free__blockptr {
    /* Note: storing the block size here is redundant, but is more */
    /* efficient than repeatedly calling the BLKSIZE macro. */
    void *blockptr; /* Starting address of block */
    struct local__free__blockptr*next; /* Next pointer */
};
```

The blockptr field contains a pointer to the start of the user data of a cached ordinary block. The local__free__blockptr*next is a pointer to the next local__free__blockptr in a linked list of cached ordinary blocks. As shown, in an embodiment of the present invention, the block size is stored in the cache pointer rather than calling a BLKSIZE macro. However, it should be apparent to those skilled in the art that the block size may also be obtained by calling the BLKSIZE macro.

For caching a small block, a different basic structure, referred to herein as the "local holding header", is utilized, and is defined as:

```
struct local__holding__head {
    holding__head *hblk:; /* Real holding head */
    header*nextcache; /* head of linked list of cached small blocks */
    header numcached; /* number of cached blocks in <nextcache> list */
};
```

The hblk is a pointer to the holding header for all small blocks of a particular size on a particular arena. The nextcache is the head of the linked list of cached small blocks. The numcached is the number of cached small blocks in the nextcache list.

The process-global cache,
    static__cache__slot__t*__cache=NULL;
is a linked list of an arrays of struct__cache__slot. Each array is referred to herein as a "cache extent". In an embodiment of the present invention, only one cache extent is initially allocated when the first call of the malloc from a threaded program. Each of the threads are allocated a cache slot from this cache extent. If all cache slots are in use when a thread makes the first call of the malloc, another cache extent is dynamically allocated. The cache extents are maintained as a linked list through the next__extent pointer of the last slot of each cache extent.

Because the linked list of cache extents is shared by all threads, access to the list must be MUTEXed. However, access is only required on the first call into the malloc from a thread and/or during a thread exit processing, at which times, the cache slots are allocated to and deallocated from the thread.

Once a cache slot allocated to a thread, the cache slot is private to that thread. When a thread is allocated a cache slot, the pointer to the slot is recorded in the thread local storage variable__m__tls, which is defined as:
    __thread__cache__slot__t*__m__tls; /* TLS for malloc cache */

A thread local storage (TLS) variable behaves like global data, except that it can have a different value for every thread. When a thread accesses a TLS variable it is actually accessing a different memory location than any other thread accessing the variable of the same name. Because each thread has a different memory location for the TLS variable, they can store different information therein, information that is private to each thread. Because the information is private to each thread, it is not a critical resource and it does not need to be MUTEXed. Since caching and allocations from a cache slot are manipulations of thread-private data structures accessible through the TLS variable, __m__tls, caching and allocations from cache slots do not need to be MUTEXed.

The memory allocator in accordance with the principles of the present invention utilizes the TLS variables to maintain thread-private caches, i.e., the cache slots. When a thread calls the free function on an allocated memory block, the block is not actually freed. Instead, the block is cached in the thread-private cache assigned to the thread. When the same thread calls the memory allocator 103, e.g., a malloc, and requests an allocation of a memory block, the cache allocator layer 106 first attempts to satisfy the request out of that thread's private cache is made. If the request cannot be satisfied from the thread private cache, the request is then satisfied from the multi-arena allocator layer 107 in a manner similar to a multi-heap solution previously discussed, and known to those familiar with memory allocators, e.g., a malloc.

Caching a block in a thread-private cache slot does not require any MUTEX locking. Thus, when a thread calls the memory allocator with a memory allocation request, and if the request can be satisfied from the cache slot, no MUTEX locking is necessary, and is thus not used. Moreover, when a cached bock is freed, the freed block is not coalesced. Thus, the free operation becomes extremely fast.

As can be appreciated, in the embodiment of the present invention thus far described, search time for cached small block allocator (SBA) blocks is constant. The average search time for cached ordinary blocks, in the embodiment of the present invention, with randomly generated uniformly distributed request sizes, is slightly better than on the order of (N/2K), where N is the number of ordinary blocks that may be cached per thread, and K is the number of power of 2 buckets. In a preferred embodiment of the present invention, each of N and K are configurable by a user.

Figure 3A:
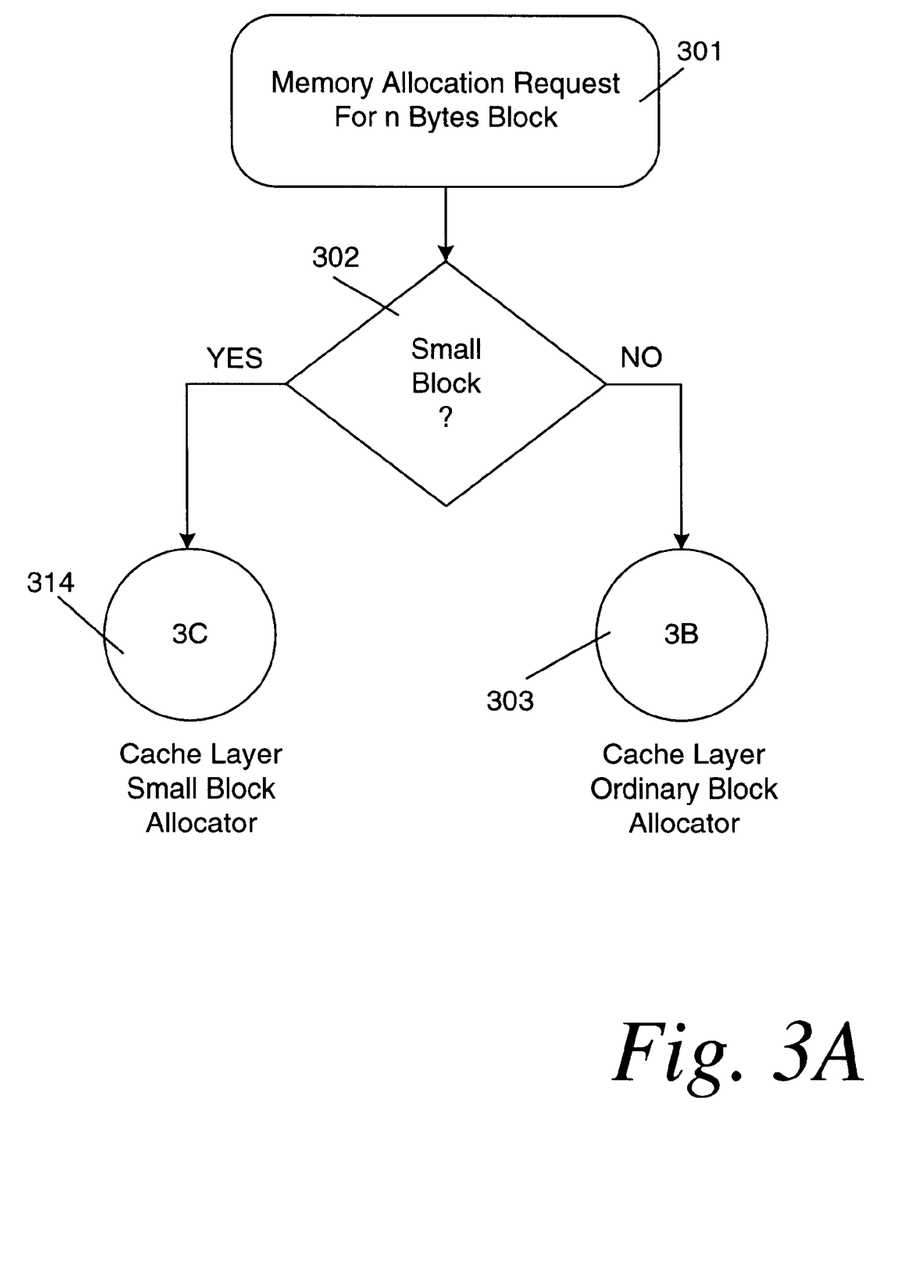
FIG. 3A is a flow diagram of an exemplary embodiment of the cache allocation process in accordance with the principles of the present invention.

The memory allocation method in accordance with an embodiment of the present invention will now be described in greater detail with references to FIGS. 3A, 3B and 3C.

Each of the cache slots comprises a portion used for caching small blocks (if the small block allocation is active) and a portion used for caching ordinary blocks. As shown in FIG. 3A, when a memory request for a block of memory having a size of n bytes is received in step 301, the memory allocator 103 determines, in step 302, whether the request may be satisfied by a small block allocator within the cache layer 106. In a preferred embodiment, the determination is based on a comparison of the block size, i.e., n bytes, with a predetermined threshold value, e.g., 512 bytes. The threshold maybe configurable by a user. If the size of the requested block is less than or equal to the threshold, then the request is satisfied by a small block allocator within the cache layer 106 as shown in FIG. 3C. On the other hand, if the size of the requested block is greater than the threshold, then the request is satisfied by an ordinary block allocator within the cache layer 106 as shown in FIG. 3B.

Figure 3B:
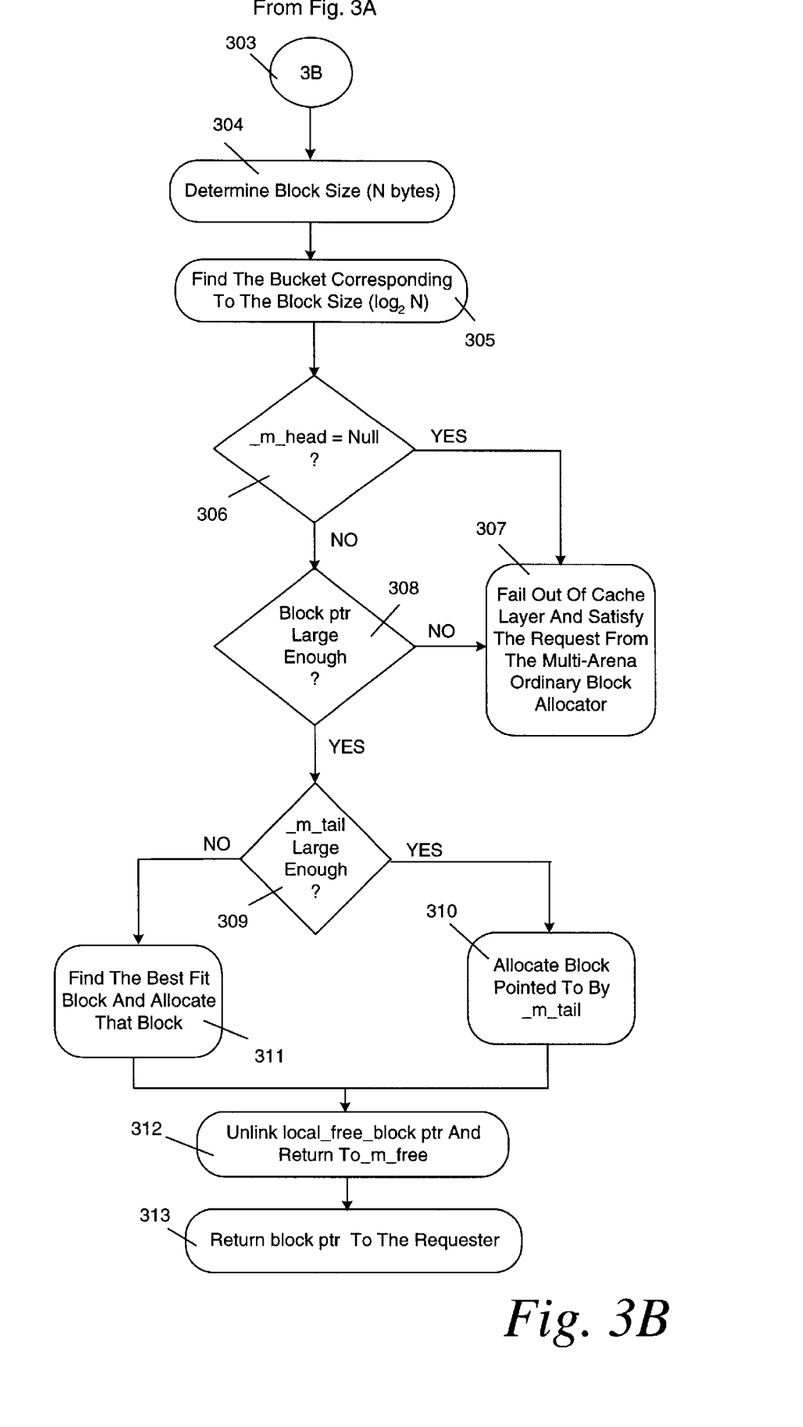
FIG. 3B is a flow diagram of an exemplary embodiment of the ordinary block cache allocation process in accordance with the principles of the present invention.

As shown in FIG. 3B, when a memory allocation request occurs for a ordinary block of size n bytes, the n bytes is first padded up with bits for block headers and bits associated with lower layers, and rounded to an even multiple of the basic system alignment to arrive at the actual block size, i.e., N bytes, in step 304.

Then, in step 305, a calculation is made to find the power of 2 bucket that would contain blocks of the size, N bytes. The $n^{th}$ power of 2 bucket contains cached blocks in the size range $2^n$–($2^{(n+1)}$–1), e.g. bucket 8 contains blocks of sizes $2^8$–($2^9$–1), or blocks with sizes of 256 bytes up to 511 bytes. In other words, the corresponding $n^{th}$ power of 2 bucket may be calculated as $\log_2 N$ truncated to an integer value.

Once the bucket corresponding to N bytes is found, a determination is made, in step 306, whether any blocks are present in the found bucket by examining the __m__head of the found bucket. Blocks are cached in descending order of sizes in each bucket, so that __m__head is always the largest block, and __m__tail the smallest. For example, if a request is made for a block having a size of 300 bytes, we look at the pointer __m__head[8] since the request falls in bucket 8. If the __m__head of the found bucket, e.g., the __m__head[8] in the above example, is NULL, no blocks of suitable size have been cached, and the process proceeds to step 307, in which the process fails out the cache layer 106 to the multi-arena layer 107 to satisfy the request in a manner well known to those familiar with operating systems and memory allocators.

If, on the other hand, the __m__head of the corresponding bucket is not NULL, a determination is made, in step 308, whether the size of the block pointed to by the __m__head of the corresponding bucket, i.e., the blockptr being pointed to by the __m__head, is large enough to satisfy the request. If it is not, the process again fails out to the multi-arena allocator layer 107 in step 307.

If, on the other hand, the blockptr is large enough, the request can be satisfied from the cache slot, and a determination for the "best fit", i.e. the smallest cached block which is large enough to satisfy the request, is made. To find the best fit, the tail, __m__tail, is examined, in step 309, to determine if it is large enough to satisfy the request. If the tail is large enough, then the tail is the best fit, and thus the block pointed by the __m__tail for the bucket is allocated in step 310. If the tail is smaller than the size required to satisfy the request, there is a best fit that lies before the tail, and thus a search for the best fit is made, in step 311, traversing from the head, __m__head, of the bucket until the best fit is found.

Once the best fit is found, in step 312, the cache pointer local__free__blockptr for the block identified as the best fit is unlinked from the linked list for the corresponding bucket, and returned to the free list __m__free. In step 313, the blockptr in that cache pointer local__free__blockptr is returned to the requester since it points to the data area of the used block that is the best fit from the cache.

Figure 3C:
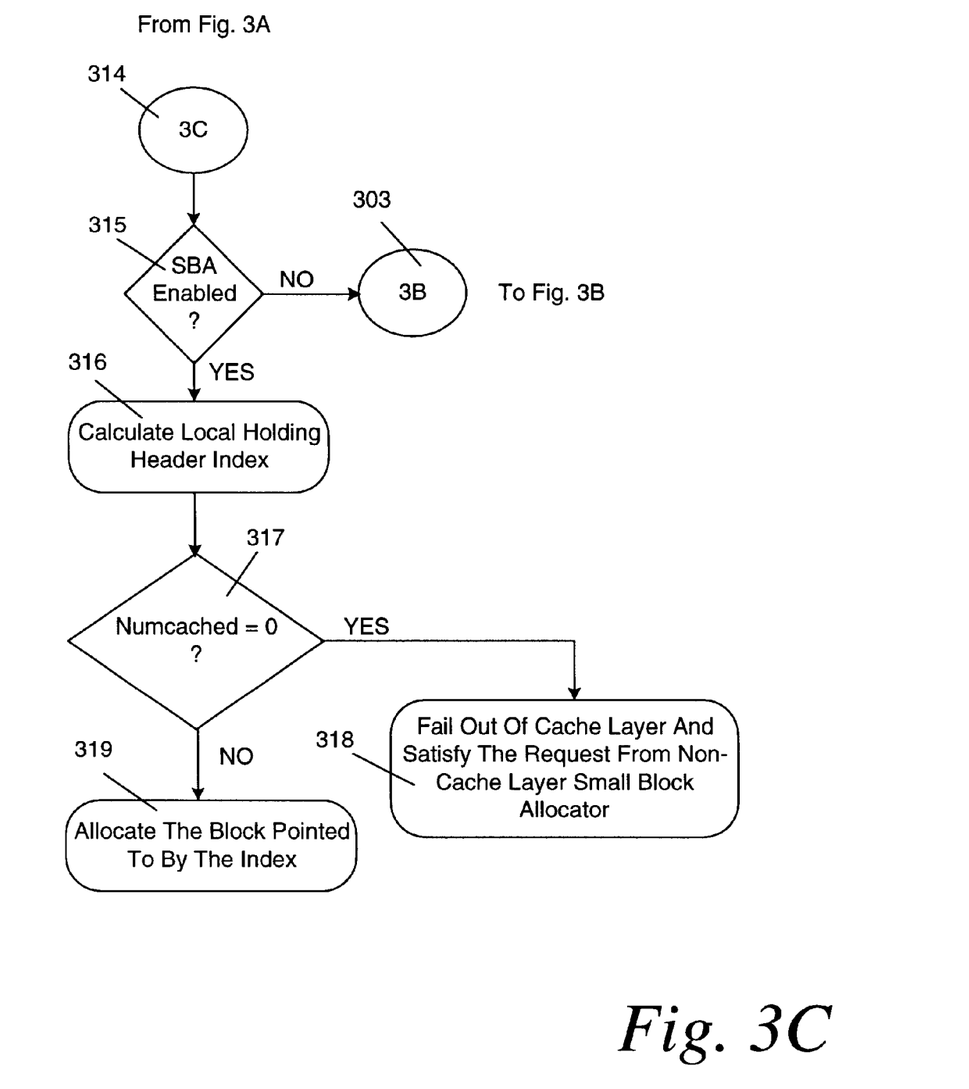
FIG. 3C is a flow diagram of an exemplary embodiment of the small block cache allocation process in accordance with the principles of the present invention.

When it is determined, in step 302, that the requested block size can be appropriately handled by the small block allocator within the cache allocator layer 106, the process proceeds to the small block allocation process as shown in FIG. 3C. As shown, allocation of a small block from the cache is a constant-time lookup.

In particular, in step 315, a determination is made whether the small block allocator is enabled. If the small block allocator is not enabled, the request is satisfied by an ordinary block allocator within the cache allocator layer 106 as shown in FIG. 3B. If, on the other hand, the small block allocator is enabled, the request is satisfied from the small block cache. In step 316, the n bytes are padded up with header bits and aligned for a small block, and the local holding header index corresponding to the resulting size of the small block is calculated.

In step 317, a determination is made whether the local holding header for this particular index has any cached blocks (i.e. testing if numcached=0). If the local holding header is empty, we fail out of the cache layer 106 to the small block allocator in the multi-arena layer 107 or the small block allocator portion 109, as appropriate, in step 318. If the local holding header has any cached blocks, i.e., numcached is not zero, then the block pointed by the index is allocated in step 319.

The process in which an ordinary block of memory is cached in accordance with an embodiment of the present invention will now be described in greater detail with references to FIG. 4.

Figure 4:
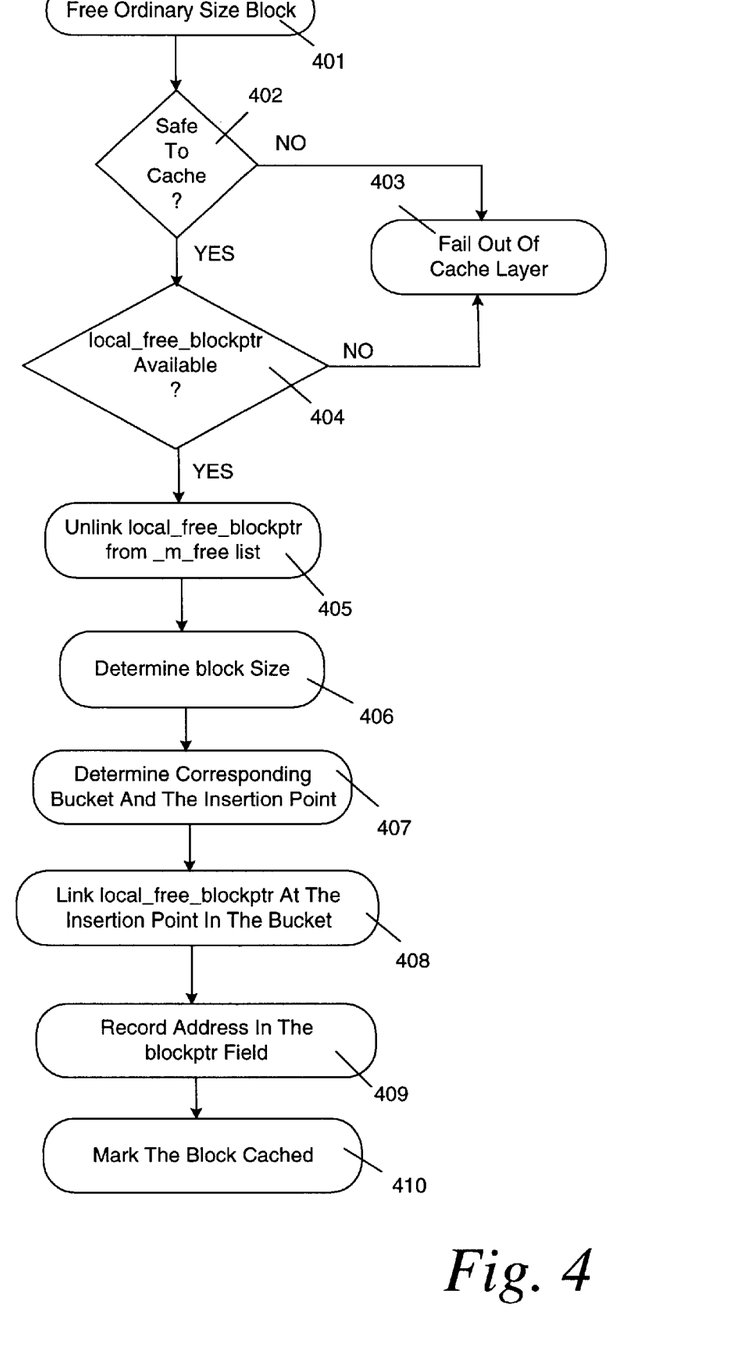
FIG. 4 is a flow diagram of an exemplary embodiment of the caching ordinary block process in accordance with the principles of the present invention.

As shown in FIG. 4, when a block having an ordinary block size is freed in step 401, a determination whether it is safe to cache the particular block is made in step 402., e.g., whether the block is a protected block and/or marked not-cacheable, etc. If it is determined that the block cannot be safely cached, the process either returns having done nothing, or fail out of the cache layer 106 to the ordinary heap free ( ) within the multi-arena layer 107, as appropriate, in step 403.

If, on the other hand, it is safe to cache the block, in step 404, a determination is made whether a local__free blockptr is available. If none is available, the process again fail out to the ordinary heap free ( ) in step 403. If a local__free__blockptr is available, the cache pointer is unlinked from the __m__free list in step 405. Then, in step 406, the block size is determined from examining the header of the block. In step 407, the bucket corresponding to the block size and the appropriate insertion point in the corresponding bucket is found, maintaining descending size order and updating the __m__tail__pointer as necessary, as previously described.

Once the local__free__blockptr is linked into the bucket in the appropriate insertion point in step 408, the address of the block supplied by the requestor that freed the block, i.e., the caller of the free ( ), is recorded in the blockptr field of the cache slot. Finally, the block is marked as cached in step 410.

The process in which a small block of memory is cached in accordance with an embodiment of the present invention will now be described in greater detail with references to FIG. 5.

Figure 5:
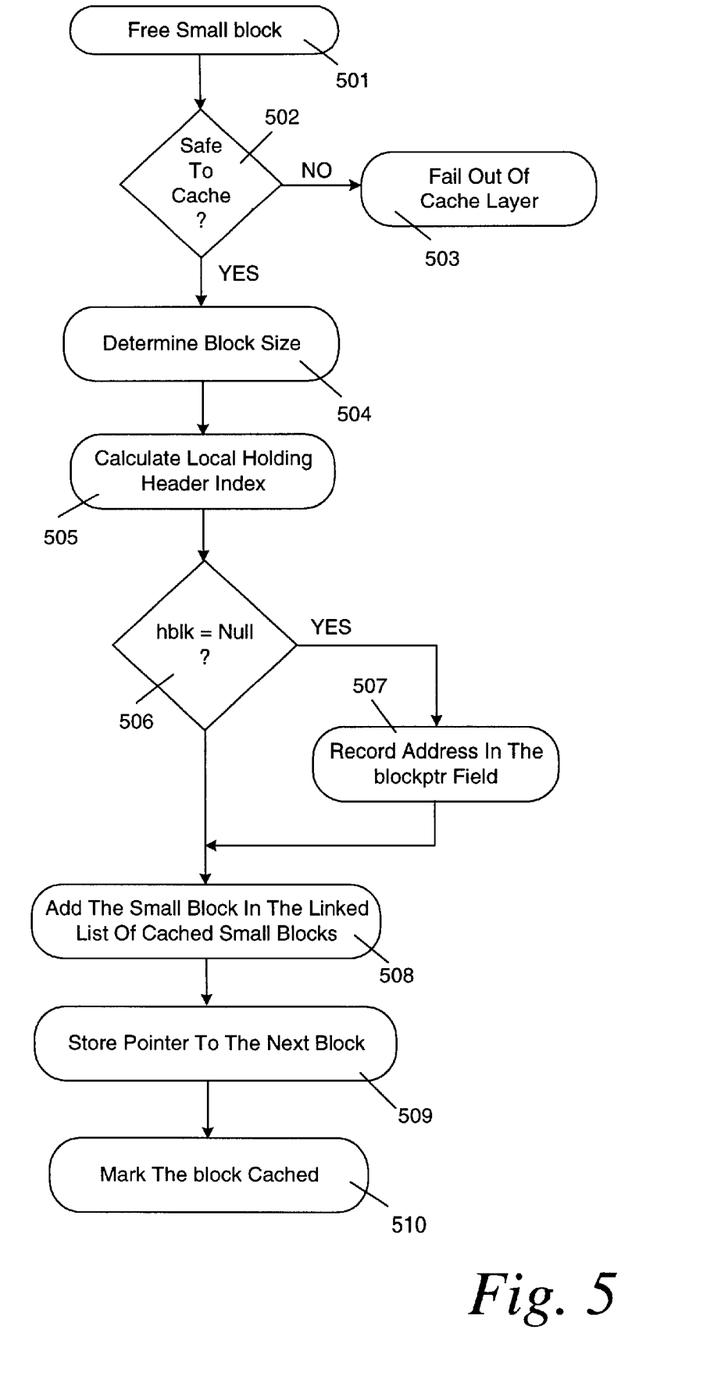
FIG. 5 is a flow diagram of an exemplary embodiment of the caching small block process in accordance with the principles of the present invention.

As shown in FIG. 5, when a small block is freed, i.e., a requester calls free( ), in step 501, a determination whether it is safe to cache the particular block is made in step 502 similarly with the ordinary block case. In addition, in a preferred embodiment of the present invention, only the holding block headers for the current thread's arena are recorded in the thread-private local holding blocks, and thus the determination includes ensuring that the freed block belong to the arena of the current thread. If it is determined that the block cannot be safely cached, the process fail out of the cache layer 106 to the SBA free( ) within the multi-arena layer 107 for handling the free request, in step 503.

If, on the other hand, it is determined that the small block may be safely cached, the size of the small block is obtained in step 504, and the local holding header index for the small block is calculated in step 505.

If it is determined, in step 506, that the local holding header (hblk), as calculated, is NULL, the header for the small block is recorded in hblk (i.e., the holding header pointer is in the header of the small block).

Next, in step 508, the small block is linked into the linked list of cached small blocks, i.e., __m__tls is stored as__sba [index].nextcache. The header of the small block is used to hold the pointer to the next block in the list in step 509. Finally, one or more flag bits are maintained in the header to indicate that this block is a small block, is used, and that the block is cached.

In accordance with an embodiment of the present invention, the memory allocator 103 may include algorithms for handling initialization and recycling of, and thread exit from, the cache slots.

When a thread is allocated a cache slot, it may be given either slot which is not initialized, or one which has previously been used and is initialized. If it is given an uninitialized slot, the local__free__blockptrs are allocated dynamically in a quantity given by configuration, which will be described in more detail later. If the small block allocator is active, an array of local headers is allocated, large enough to hold all the indexes that are needed for the SBA configuration. The arena of the thread is recorded in the arena__id of the slot.

When a thread exists, a thread exit callback routine recycles its cache slot for reuse by other threads. In this case, the cache slot becomes available for use by another thread, and retains its cached blocks, i.e., it becomes a free slot, but still initialized. If the SBA is active, an initialized cache slot cannot be allocated to a thread on an arena other than the arena of the cache slot. This is because the local holding headers in the cache slot point to the arena of the cache slot, and thus if small blocks from a thread on a different arena using the cache slot are cached, incorrect header information may be introduced in the blocks when the blocks are allocated.

The memory allocator 103 will first try to find an initialized cache slot for a thread which has the same arena as the thread. If an initialized cache slot cannot be found, The memory allocator 103 will next try to find any free slot. If a fee slot which is initialized for a different arena is found, all the small blocks for that arena are freed before allocating the cache slot to the thread. If no free slot is available, another cache extent may be provided.

In accordance with an embodiment of the present invention, the memory allocator 103 may also include algorithms for handling retirement of a cache slot.

A program which eventually settles down to a smaller number of threads after spawning a much larger number of threads initially may have cache slots that are no longer in use. Retirement is a mechanism for freeing the memory in those disused cache slots. Whenever a thread exits and its cache is recycled, a time stamp is placed on the cache slot, i.e., in the time__t__last__used. Whenever a thread is allocated a cache slot, or when a thread exits, if retirement feature is enabled, all free cache slots are checked to determine whether the respective time stamps indicate that any of the free cache slots have exceeded a configurable retirement age. Those that have exceeded the configurable retirement age are "retired", i.e., all the respective cached blocks are freed, as is all other memory associated with the respective cache slots (except the slot structure itself). The retired cache slots become uninitialized.

In a preferred embodiment of the present invention, the cache size and the retirement age are configurable by a user by means of environment variables. In this embodiment, the maximum power of 2 bucket (i.e. the maximum size of ordinary block that will be cached), the total number of ordinary blocks that will be cached, and the retirement age are all configurable by the environment variable, __M__CACHE__OPTS. The small block cache, however, has no separate configuration, and is active whenever both cache layer small allocator and the SBA 109 are active.

As can be appreciated, an efficient system for allocating memory to multiple threads, which does not requiring MUTEX locking, and which also eliminates the need for coalescence operations, has been described.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of allocating a block of memory in response to a memory allocation request from a thread in a multi-threaded operating system, comprising:

providing a cache slot being private to said thread, said cache slot having cached therein said block of memory previously freed by said thread;

determining whether said memory allocation request can be satisfied out of said cache slot;

if said memory allocation request can be satisfied out of said cache slot, satisfying said memory allocation request out of said cache slot;

determining whether said block of memory has a block size not greater than a predetermined threshold size; and satisfying said memory allocation request out of a small block cache portion of said cache slot if said block size is not greater than said predetermined threshold size.

2. The method of allocating a block of memory in accordance with claim 1, further comprising:

defining a structure of said cache slot;

wherein said structure comprises:

a local holding header defining an array of local holding headers for caching small blocks;

a first local free block pointer defining a linked list of free cache pointers for caching ordinary blocks;

a second local free block pointer defining an array of pointers to heads of a linked lists of cached ordinary blocks; and a third local free block pointer defining an array of pointers to tails of said linked lists of cached ordinary blocks; and wherein said second local free block pointer and said third local block pointer are indexed by buckets, each of said buckets having stored therein one or more memory blocks arranged in a descending order of size; and wherein said heads of said linked lists of cached ordinary blocks contain largest blocks of each of respective buckets, and said tails of said linked lists of cached ordinary blocks contain smallest blocks of each of respective buckets.

3. The method of allocating a block of memory in accordance with claim 2, wherein:
said structure of said cache slot further comprises;
a initialized flag indicating whether said cache slot has been initialized;
a free flag indicating whether said cache slot is free;
an arena identification specifying an arena of said thread holding said cache slot;
a last used time indication indicating a last time said cache slot was used by said thread; and
a pointer to a next extent of cache slot, said extent of cache slot comprising a linked array of a plurality of cache slots.

4. The method of allocating a block of memory in accordance with claim 1, further comprising:
storing a pointer to said cache slot as a thread local storage variable of said thread.

5. The method of allocating a block of memory in accordance with claim 1, further comprising:
satisfying said memory allocation request out of a ordinary block cache portion of said cache slot if said block size is greater than said predetermined threshold size.

6. The method of allocating a block of memory in accordance with claim 5, wherein said step of satisfying said memory allocation request out of a ordinary block cache portion of said cache slot comprises:
finding a bucket corresponding to said block size;
finding a best fit block within said bucket, said best fit block being the smallest cached block in said bucket, which is large enough to satisfy said memory allocation request; and
returning a pointer to said best fit block to said thread.

7. The method of allocating a block of memory in accordance with claim 6, wherein said step of finding said bucket corresponding to said block size comprises:
determining an $n^{th}$ power of two bucket, said $n^{th}$ power of two bucket containing cached blocks in a size range $2^n$ to $(2^{(n+1)}-1)$ bytes, and
wherein said block size being in said size range.

8. The method of allocating a block of memory in accordance with claim 7, wherein said step of finding said best fit block comprises:
traversing from a head of said bucket to a tail of said bucket to find said best fit block, which is just large enough to satisfy said memory allocation request.

9. The method of allocating a block of memory in accordance with claim 1, wherein said step of satisfying said memory allocation request out of said small block cache portion of said cache slot comprises:
calculating a local holding header index;
determining whether a local holding header corresponding to said local holding header index has at least one cached block; and
allocating a small block being pointed to by said local holding header index if said local holding header corresponding to said local holding header index has at least one cached block.

10. A computer readable storage medium having stored thereon a computer program for implementing a method of allocating a block of memory in response to a memory allocation request from a thread in a multi-threaded operating system, said computer program comprising a set of instructions for:
providing a cache slot being private to said thread, said cache slot having cached therein said block of memory previously freed by said thread;
determining whether said memory allocation request can be satisfied out of said cache slot;
if said memory allocation request can be satisfied out of said cache slot, satisfying said memory allocation request out of said cache slot; and
determining whether said block of memory has a block size not greater than a predetermined threshold size; and
satisfying said memory allocation request out of a small block cache portion of said cache slot if said block size is not greater than said predetermined threshold size.

11. The computer readable storage medium according to claim 10, wherein said computer program further comprising one or more instructions for:
defining a structure of said cache slot;
wherein said structure comprises:
a local holding header defining an array of local holding headers for caching small blocks;
a first local free block pointer defining a linked list of free cache pointers for caching ordinary blocks;
a second local free block pointer defining an array of pointers to heads of a linked lists of cached ordinary blocks; and
a third local free block pointer defining an array of pointers to tails of said linked lists of cached ordinary blocks; and
wherein said second local free block pointer and said third local block pointer are indexed by buckets, each of said buckets having stored therein one or more memory blocks arranged in a descending order of size; and
wherein said heads of said linked lists of cached ordinary blocks contain largest blocks of each of respective buckets, and said tails of said linked lists of cached ordinary blocks contain smallest blocks of each of respective buckets.

12. The computer readable storage medium according to claim 11, wherein:
said structure of said cache slot further comprises;
a initialized flag indicating whether said cache slot has been initialized;
a free flag indicating whether said cache slot is free;
an arena identification specifying an arena of said thread holding said cache slot;
a last used time indication indicating a last time said cache slot was used by said thread; and
a pointer to a next extent of cache slot, said extent of cache slot comprising a linked array of a plurality of cache slots.

13. The computer readable storage medium according to claim 10, wherein said computer program further comprising one or more instructions for:
storing a pointer to said cache slot as a thread local storage variable of said thread.

14. The computer readable storage medium according to claim 10, wherein said computer program further comprising one or more instructions for:
satisfying said memory allocation request out of a ordinary block cache portion of said cache slot if said block size is greater than said predetermined threshold size.

15. The computer readable storage medium according to claim 14, wherein said computer program further comprising one or more instructions for:
finding a bucket corresponding to said block size;
finding a best fit block within said bucket, said best fit block being the smallest cached block in said bucket, which is large enough to satisfy said memory allocation request; and
returning a pointer to said best fit block to said thread.

16. The computer readable storage medium according to claim 15, wherein said computer program further comprising one or more instructions for:

determining an $n^{th}$ power of two bucket, said $n^{th}$ power of two bucket containing cached blocks in a size range $2^n$ to $(2^{(n+1)}-1)$ bytes, and wherein said block size being in said size range.

17. The computer readable storage medium according to claim 16, wherein said computer program further comprising one or more instructions for:

traversing from a head of said bucket to a tail of said bucket to find said best fit block, which is just large enough to satisfy said memory allocation request.

18. The computer readable storage medium according to claim 10, wherein said computer program further comprising one or more instructions for:

calculating a local holding header index;

determining whether a local holding header corresponding to said local holding header index has at least one cached block; and allocating a small block being pointed to by said local holding header index if said local holding header corresponding to said local holding header index has at least one cached block.

* * * * *